No. 863,630. PATENTED AUG. 20, 1907.
S. PANELLI.
MOTOR BICYCLE.
APPLICATION FILED NOV. 14, 1906.
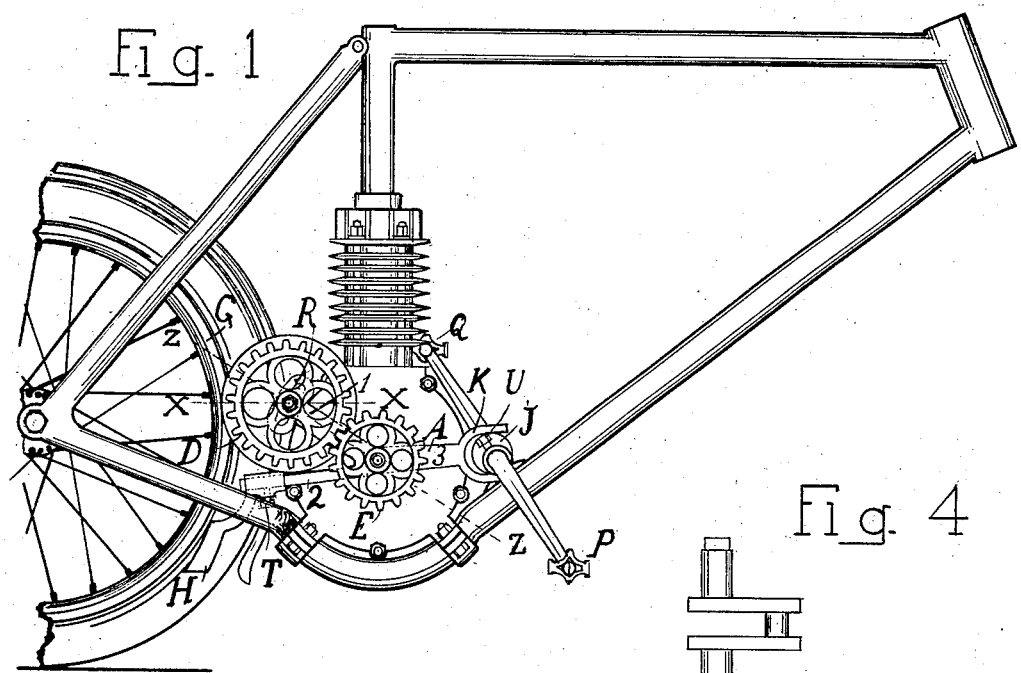
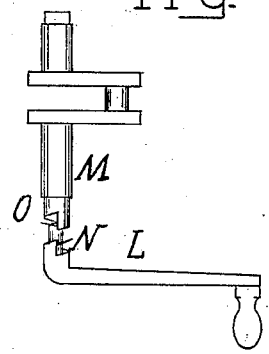
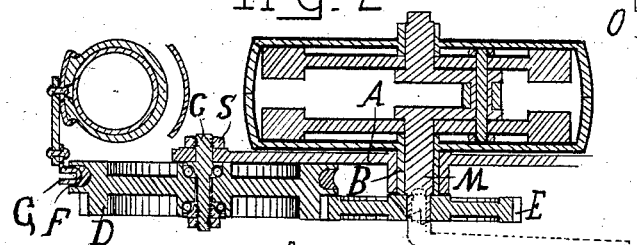
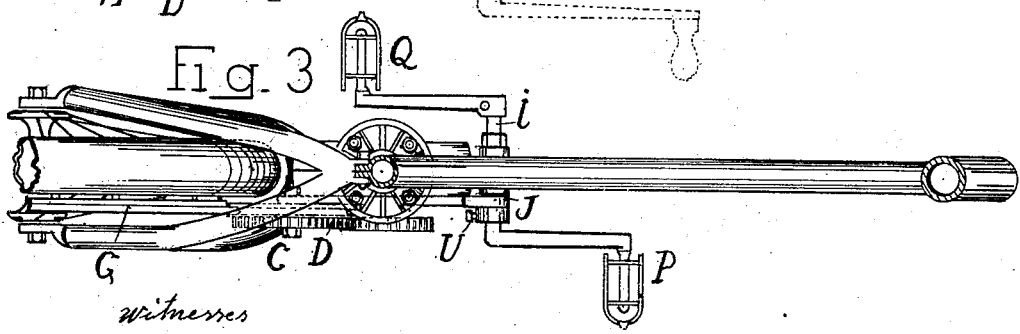
Witnesses
John Vic. Koerner
Cesar Steinhilber
Inventor
Silvester Panelli

UNITED STATES PATENT OFFICE.

SILVESTER PANELLI, OF WORCESTER, MASSACHUSETTS.

MOTOR-BICYCLE.

No. 863,630.   Specification of Letters Patent.   Patented Aug. 20, 1907.

Application filed November 14, 1906. Serial No. 343,387.

*To all whom it may concern:*

Be it known that I, SILVESTER PANELLI, a citizen of the United States, residing at Worcester, in the county of Worcester and State of Massachusetts, whose post-office address is No. 21 Lagrange street, Worcester, Massachusetts, have invented certain new and useful Improvements in Motor Vehicles or Cycles, of which the following is a specification.

My invention relates to improvements in motor-vehicles or cycles in which the driving wheels receive the motor propulsion by means of chains or belts, and requiring hard working of the operator in turning the feet-pedals before the motor's action is attained, thus rendering it impossible to start said motor-vehicle or cycle in upgrade direction with the foot-pedal system. And the objects of my invention are, first, to arrange an easier starting by providing said motor-vehicles or cycles with a starting-handle hereinafter described; second, to reduce the mechanism by dispensing with several complicated and expensive parts, as chains, sprockets, or belts and coaster brake; and third, to afford facilities for adjustment in all parts enabling any common experienced operator to adjust the machine properly. I attain these objects by the mechanism illustrated in the accompanying drawings, in which—

Figure 1. shows a side view of the entire transmitting device; Fig. 2. is an enlarged cross section on line Z Z, and an adjoined section of line X X Fig. 1; Fig. 3 is a top view of Fig. 1; Fig. 4 shows the starting-handle applied to the motor-shaft.

Similar letters refer to similar parts throughout the several views.

"A" designates the transmitter rotating freely on the motor shaft hub or bearing "B". Said transmitter has three different branches marked 1, 2, 3. Branch 1 is provided with a pin "C" on which revolves on ball bearings a combined gear and friction roll "D"; the gear meshes with the motor pinion "E" and the friction roll provided with an external groove "F" partly filled with rubber, or any other non-slipping material engages the friction rim "G" (the latter forming a part of the rear driving wheel,) a brake "H" is secured to branch 2 of the transmitter, also acting upon the friction rim "G"; the axle of the pedal crank "I" has an eccentric wheel or cam "J" securely fastened to it and fitting between the jaws of the fork "K", this later forming branch 3 of the transmitter "A". A starting handle "L" is applied to the motor-shaft "M" so that the lug or catch "N" of the handle engages the lug or catch "O" of the motor-shaft. It is then turned around, which starts the motor. As soon as the motor starts the rapid motion of the shaft overtakes the movement of the handle and the spiral faces push the handle out of the socket. The operator then mounts the vehicle. By pressing on the right pedal "P" the eccentric wheel or cam "J" moves the fork or branch 3 upward which throws the friction roll groove "F" in frictional contact with the friction rim "G" transmitting the power from the motor to the rear driving wheel. By placing the pedals in a horizontal position the transmitter is thrown in a mid position holding both the brake "H" and the friction roll "F" away from the friction rim "G", thus enabling the operator to take advantage of down grades independent of the motor. Also by pressing down the left pedal "Q" the brake "H" is brought in contact with said friction rim "G", thus checking the speed or bringing the vehicle to a stop according to the pressure put on the pedal.

This form of transmission can be easily adjusted by any common experienced operator as it is seen in Fig. 1. The transmitter branch 1 is provided with a link "R" cut circumferentially with the hub "B", through which link the pin "C" passes and is secured by a nut "S", By means of said link the combined gear and friction roll "D" can be shifted accordingly to allow the friction groove "F" to engage the friction rim "G" within the limited swinging of the transmitter, thus without moving the gear from its circular engagement with the motor pinion "E". The brake "H" is also adjustable as it is capable of being moved back and forth on the transmitter branch 2 and secured to the proper place on it by means of a set screw "T", providing means to enable said brake to engage the friction rim within the limited swinging of the transmitter.

The eccentric wheel or cam "J" is secured to the axle of the pedal crank with a set-screw "U" so that if the operator prefers to transmit the power by pressing the left pedal and set the brake by pressing the right one he can do so. By loosening the set-screw "U" the pedal crank can be turned and held in any position the operator prefers.

The height of this motor-cycle need not be over 32 inches measuring from the wheel base to the saddle, (the latter secured at the lowest point) so that any operator of middle height can mount the vehicle without lifting his body upward to reach the seat or saddle, and also to minimize the proportion and weight of the machine, thus being more easy to manage in case of danger, and in addition to this, the brake, after it is applied is capable of holding its pressure on the friction rim the same as when the foot-pressure is on the pedal enabling the operator to help himself with both feet on the ground without dismounting.

What I claim as my invention and desire to secure by Letters Patent is:—

1. In a motor vehicle or cycle, a combined transmitter and brake pivoted on the hub of the motor-shaft and actuated by an eccentric wheel or cam rotating between the jaws of a fork projecting from said transmitter, and the eccentric wheel or cam operated by the pedal cranks.

2. In a motor vehicle or cycle a combined transmitter and brake pivoted on the hub of the motor-shaft and having a branch or arm carrying a combined gear and friction roll, the gear engaging with the motor pinion and the friction roll engaging in frictional contact with a friction rim attached to the rear driving wheel, an eccentric wheel or cam rotating between the jaws of a fork projecting from said transmitter, and the eccentric wheel or cam operated by the pedal cranks, constituting means to connect and disconnect the motor power to and from the vehicle.

3. In a motor vehicle or cycle, a combined transmitter and brake pivoted on the hub of the motor-shaft and having a branch or arm provided with a link cut circumferentially with the hub or pivot, a pin carrying a combined gear and friction roll which may be secured at any place within said link without moving the gear from its circular engagement with the motor pinion, and means to allow the friction roll to engage and leave the friction rim within the limited swing of the transmitter.

4. In a motor vehicle or cycle, the combination of a transmitter pivoted on the hub of the motor shaft and a combined gear and friction roll actuated by the motor pinion and capable of transmitting the power to a friction rim fastened to the rear driving wheel, said transmitter provided with a brake held to it by means of a set-screw, the latter holding said brake at the proper place on the transmitter, and the eccentric wheel or cam operated by the pedal cranks and rotating between the fork projecting from the transmitter capable of transmitting the power and setting the brake while operated as set forth.

5. In a motor vehicle or cycle, the combination of an eccentric wheel or cam secured on the axle of the pedal cranks with a set-screw by means of which latter the axle is capable of being turned in the eccentric wheel or cam, to hold the pedal cranks in any position wanted, and to operate the power or brake with any one of the pedals, all substantially as set forth.

SILVESTER PANELLI.

Witnesses:
  JOHN VIC. KOENCE,
  CESAR STEINHILBER.